United States Patent [19]

McClung

[11] 4,395,503

[45] Jul. 26, 1983

[54] ANTENNA GROUT REPLACEMENT SYSTEM

[75] Inventor: Charles E. McClung, Kettering, Ohio

[73] Assignee: The United States of America as represented by the Administrator of the National Aeronautics and Space Administration, Washington, D.C.

[21] Appl. No.: 233,271

[22] Filed: Feb. 10, 1981

[51] Int. Cl.³ .............................................. C08L 63/00
[52] U.S. Cl. ................................... 523/440; 523/443; 384/124
[58] Field of Search ................... 260/37 EP; 523/440, 523/443, 150

[56] References Cited

U.S. PATENT DOCUMENTS

| | | | |
|---|---|---|---|
| 3,007,888 | 11/1961 | Mack et al. | 260/37 EP |
| 3,242,116 | 3/1966 | Becker et al. | 260/37 EP |
| 3,251,786 | 5/1966 | Edmunds | 523/440 |
| 3,407,165 | 10/1968 | Oepkes et al. | 523/440 |
| 3,547,871 | 12/1970 | Hofmann | 260/37 EP |
| 3,677,995 | 7/1972 | Earing | 260/37 EP |

*Primary Examiner*—Lewis I. Jacobs
*Attorney, Agent, or Firm*—Thomas H. Jones; John R. Manning

[57] ABSTRACT

An epoxy grout suitable for use in mounting and positioning bearing runner plates used in hydrostatic bearing assemblies for rotatably mounting large radio telescope structures to stationary support pedestals. The epoxy grout may be used in original mountings or may be used as part of a replacement system for repairing cavities in existing grout resulting from grout deterioration. The epoxy grout has a relatively short work life and cure time even in the presence of hydraulic oil. The epoxy grout cures without shrinking or sagging to form a grout which is sufficiently strong and durable to provide a grout especially well-suited for use under the high pressure loading and close tolerance requirements of large hydrostatic bearing assemblies.

9 Claims, 4 Drawing Figures

ANTENNA GROUT REPLACEMENT SYSTEM

ORIGIN OF THE INVENTION

The invention described herein was made in the performance of work under a NASA contract and is subject to the provisions of Section 305 of the National Aeronautics and Space Act of 1958, Public Law 83-568 (72 Statute 435; 42 USC 2454).

TECHNICAL FIELD

The present invention relates to hydrostatic bearings. More particularly, the present invention relates to hydrostatic bearings for supporting large radio telescope antennas and to an improved grout for use in mounting and precisely positioning the runner plate of the bearing assembly on a stationary pedestal within the extremely close tolerances necessary to insure functioning of the assembly.

BACKGROUND ART

Referring to FIG. 1, a diagrammatic representation of a typical radio telescope is shown generally at 10. The radio telescope 10 is a typical radio telescope having a lower stationary pedestal 12 and an upper radio telescope base 14 mounted thereon for azimuth rotation. The radio telescope dish 16 is mounted on the radio telescope base 14 by suitable struts and vertically rotatable mounting means 18. Typically, large radio telescopes will have upper structures including the radio telescope base 14, telescope dish 16 and mounting means 18 weighing in excess of 6 million pounds. It is important that a suitable, reliable means be provided for azimuth rotation of this extremely large heavy structure relative to the stationary pedestal 12. In order to achieve the desired smooth and reliable rotation of the telescope base 14 in azimuth about the pedestal 12, hydrostatic bearings have typically been utilized.

FIG. 2 is a representation of a typical three pad hydrostatic bearing assembly. The bearing assembly is shown generally at 20. The bearing assembly 20 typically includes a bearing runner support 22 for supporting the upper bearing pads 24. A thin film of hydraulic oil in the neighborhood of three thousandths of an inch to twelve thousandths of an inch thick is provided between the bearing pads 24 and the bearing runner support 22. The bearing pads slide smoothly and relatively friction free over this extremely thin film layer. As is well known, it is extremely important that the upper surface of the runner support 22 be extremely smooth and level and that the lower face of the bearing pad 24 which rides over the runner support 22 be equally as smooth in order to maintain a uniform film of oil between the two. If the runner support 22 becomes bent or deformed in anyway, the bearing pad 24 may dig into or ground out on the runner support 22 resulting in destruction of the smooth upper runner support surface. Repairing scratches or grooves resulting from a ground out condition is a very expensive and time consuming process which is to be avoided at all costs.

In order to insure that the bearing runner support 22 provides as smooth and level a bearing support surface as possible, bearing runner support grout 26 is typically used on top of the stationary pedestal 12 to provide a suitable surface for mounting and precisely positioning the bearing runner support 22.

Of the many types of grouts available for mounting the runner support 22, a Portland cement type grout is now commonly used. Although this type of Portland cement grout is suitable in many respects for its intended purpose, problems have been encountered because of the relatively short service life of the grout ranging from months to several years. Over the period of time, the Portland cement deteriorates and cracks or crumbles thereby allowing bending or sagging of the bearing runner support and the resultant possibility of bearing pad grounding.

In order to prevent the possible diastrous grounding of the bearing support pads, the deteriorated grout must be replaced periodically. This results in lost tracking time which, in addition to material and labor costs is very expensive. It is therefore highly desirable to provide a suitable grout which will not deteriorate for as long a time as possible.

It is believed that deterioration of grout is mainly due to the continual extreme pressure loading and unloading at various areas around the runner support 22 due to the continual traveling of the three bearing pads 24. Further, seepage of hydrostatic oil between runner support plates and into the grout is also believed responsible for premature deterioration of grout. The presence of seepage oil in and near the grout not only causes deterioration but is troublesome in repairing the deteriorated grout since it increases curing time of Portland cement grouts thereby increasing the amount of expensive lost tracking time.

It is therefore very desirable to provide a suitable grout which may be used in the construction of new radio telescope antennas and more importantly which may be suitable for replacing the deteriorating grout present in existing structures.

SUMMARY OF THE INVENTION

In accordance with the present invention, an improved hydrostatic bearing grout is disclosed which is suitable for use as both an original hydrostatic bearing grout and as part of a grout replacement system. The grout of the present invention is an epoxy based grout consisting of between about 10 to 20% by weight epoxy resin, 80 to 90% by weight inert filler having a mesh size of below 10 and a curing agent. A thickening agent is also preferably added to provide a non-sagging curable grout. The thickening agent is also believed to increase the strength and durability of the final cured epoxy grout.

The epoxy grout in accordance with the present invention is particularly well suited for use in replacing holes, cracks and crevices in deteriorated Portland cement grout. It fills the larger voids and also flows into smaller void irregularities in the deteriorated areas of the grout. It has a sufficient load carrying capability to handle the extreme pressures generated beneath the bearing paths and retains its "as-placed" volume with no shrinking or expansion.

A further important characteristic of the epoxy grout of the present invention is that it typically has a relatively short work life and cures very quickly so that even in the presence of hydraulic oil, the epoxy grout cures sufficiently within several hours to support the weight of a radio telescopic antenna. To make the resin mixture more workable, a thickening agent such as anhydrous and particulate colloidal silica is added to the epoxy to promote the desired non-sagging characteristics of the grout. As previously mentioned, it is also believed that the use of the particulate colloidal silica may also provide some reinforcing or strengthening characteristics to the epoxy composition.

The above discussed and many other features and attendant advantages of the present invention will become apparent as the invention becomes better understood by reference to the following detailed description when considered in conjunction with the accompanying drawings.

DETAILED DESCRIPTION OF A PREFERRED EXEMPLARY EMBODIMENT

Figure 1:
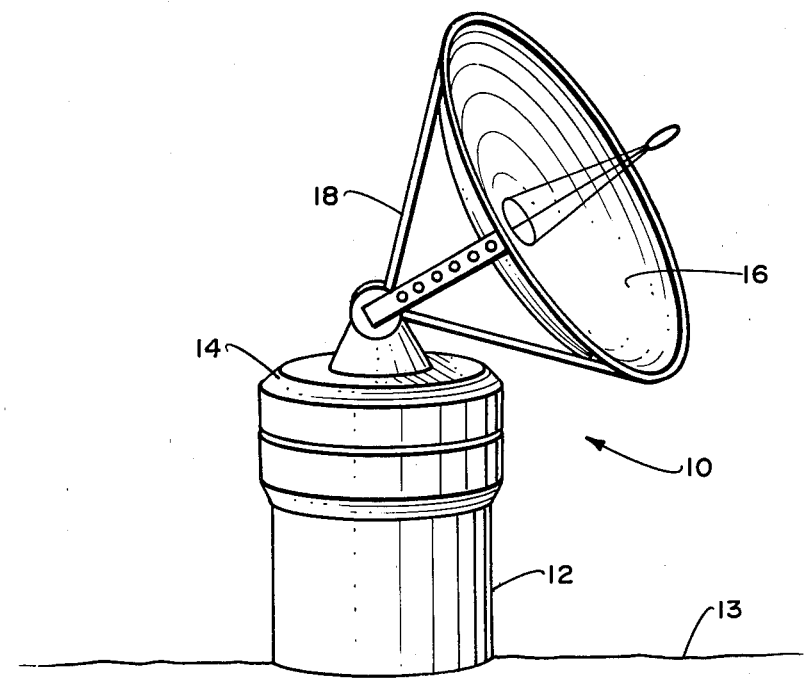
FIG. 1 is an elevational diagrammatic view of a conventional large radio telescope.
Figure 2:
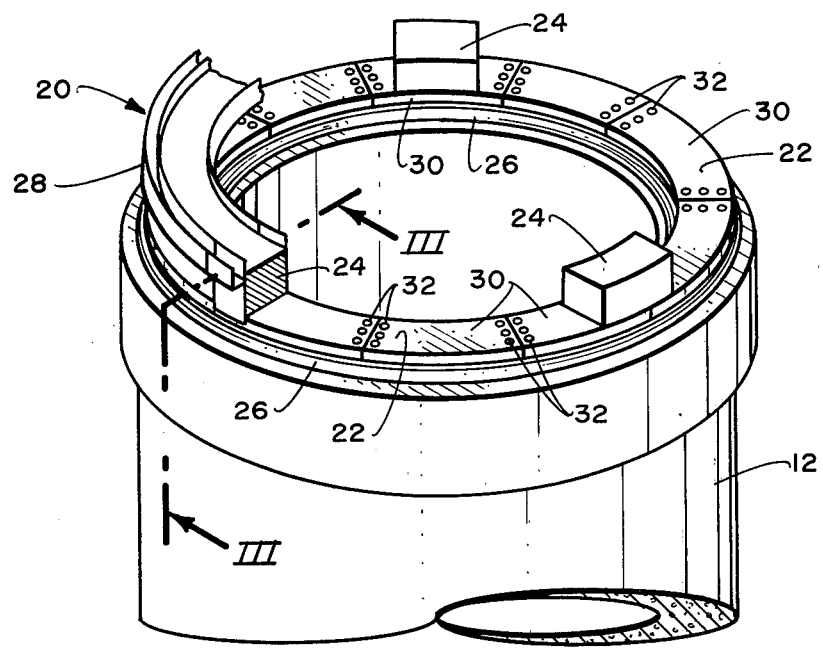
FIG. 2 is a diagrammatic partial view showing a typical hydrostatic bearing assembly.
Figure 3:
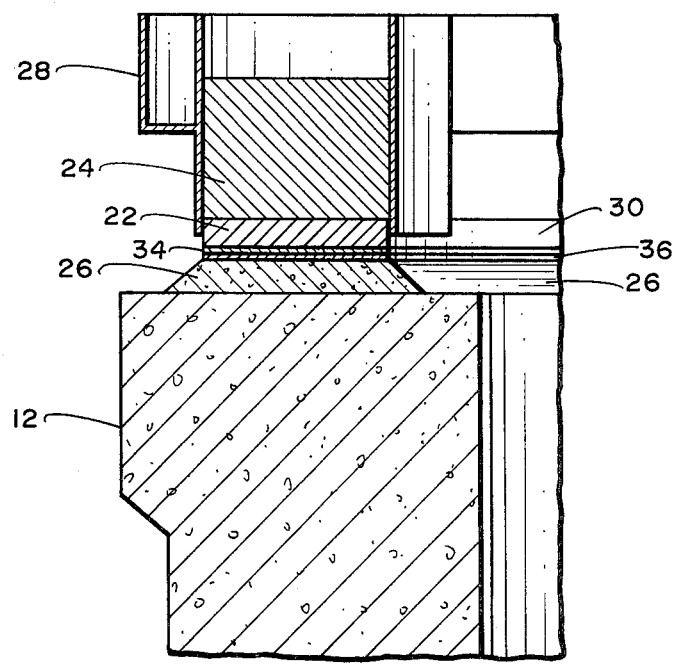
FIG. 3 is a view of FIG. 2 taken in the III—III plane.

As discussed in the background of the invention and shown in FIGS. 1 and 2, the present invention is designed for use in combination with a hydrostatic bearing assembly 20 which is commonly used in typical azimuth mounting of radio telescopes. As previously discussed, a typical radio telescope 10 includes a stationary pedestal 12 mounted on suitable terrain 13. The radio telescope base 14 is mounted by way of the hydrostatic assembly on top of the stationary pedestal 12 for azimuth rotation. As shown in FIG. 2, the hydrostatic bearing assembly 20 includes a bearing ring 28 which is secured to the radio telescope base 14. On the bottom of bearing ring 28, three bearing pads 24 are equidistantly mounted around the bearing ring 28 perimeter. Each bearing pad 24 sits on its lower surface upon a thin film of hydraulic oil which is carried on the bearing runner support 22. The runner support 22 is divided to runner plates 30 with each runner plate 30 being secured to the stationary pedestal 12 by way of bolts 32. The present invention is directed to providing an improved grout as set forth below which is shown at 26 and is provided between the runner plates 30 and pedestal 12 in order to insure a smooth uniform and level mounting surface for mounting and precisely positioning runner plate 30. As best shown in FIG. 3, sole plates 34 and 36 are also preferably provided between the grout 26 and runner support 22 to help achieve the close tolerances necessary.

It should be pointed out that although the epoxy grout of the present invention is particularly well suited for use as an original grout and as replacement grout for Portland cement grout in radio telescope bearing assemblies, the epoxy grout may also be used in other bearing assemblies where a grout is needed which is fast curing, strong, impervious to oil during and after curing and which does not alter its dimensions significantly upon curing. Such applications might include but are not limited to bridge support bearing assemblies utilized to compensate for expansion and contraction of bridge structures or other bearing assemblies where high pressures and stresses are encountered.

The preferred grout in accordance with the present invention consists essentially of between about 10 to 20% by weight epoxy resin, mixed with 80 to 90% by weight inert filler having a U.S. mesh size of below 10 and a curing agent. Further, it is particularly desirable to include a sufficient amount of thickening agent such as anhydrous and particulate colloidal silica to produce a workable material which may be tamped or otherwise applied as a grout without sagging.

The epoxy resin is preferably a Bis-Phenol A epoxy resin. The preferred Bis-Phenol A epoxy resin is of the liquid type having a non-cured equivalent weight of between 175 and 200. The viscosity of the liquid epoxy is preferably between 10,000 and 18,000 CPS measured at 25° C. Preferred epoxies which are readily available include Epon 828 available from Shell Chemical Corporation and/or Dow DER 331 available from Dow Chemical Corporation. Other epoxy resins may be utilized if they provide the same physical handling characteristics and curing qualities.

The inert filler is preferably an aggregate such as sand or graded sand having a mesh size of below 10 and preferably below 8. The mesh size of the aggregate is particularly important since aggregate particles which are too coarse result in weakening of the cured grout structure. The aggregate may include pebbles and/or sand suitably sized within the preferred mesh size range.

With regards to the curing agent, any number of curing agents which are suitable for curing epoxy resins may be utilized. However, it is preferred that an amine curing agent or co-reactant such as triethylene tetramine be utilized. Other medium-fast room temperature curing agents may be utilized. Preferably the curing time or pot life at 23° C. is less than one hour. The curing agent should also provide a rigid cured epoxy. Other possible curing agents include di-ethylene triamine. Other secondary amine and non-amine curing agents or co-reactants may be utilized, however, it is important that the curing agent provides relatively fast curing at room temperature to a rigid resin.

With regard to the thickening agent, sufficient thickening agent should be utilized to provide a workable resin prior to application as grout. Usually less than 5 percent by weight thickening agent should be added with about 2 percent by weight being preferred. A preferred thickening agent is Cab-O-sil which is a colloidal silica manufactured by Cabot Corporation. Other thickening agents include KLUCELS marketed by Hercules Company and AEROSILS marketed by DeGussa Company.

Examples of practice are as follows. Two 190 lb. batches of the epoxy grout in accordance with the present invention were prepared with each having the following composition:

| Ingredient | g | lb | Percent | Source |
| --- | --- | --- | --- | --- |
| Aggregate - JPL, less than 8 | 71,070 | 156.53 | 82.07 | JPL |
| Cab-O-Sil M-5 | 1,720 | 3.80 | 1.99 | Cabot Corp. |
| Epon 828 | 12,200 | 26.87 | 14.09 | Shell Chemical |
| Triethylenetetramine (TETA) | 1,600 | 3.53 | 1.85 | Dow Chemical |
| TOTALS | 86,590 | 190.73 | 100.00 | |

The two 190 lb. batches were used to fill 18×44×6 inch cavities which were designed to simulate grout deteriorated areas in a typical radio telescope.

The two 190 lb. batches of epoxy group material were mixed in a 6 cubic foot mortar mixer driven by an 8 horsepower gasoline engine. The engine drove the paddles of the mixer through a V-belt type drive. Mixing was carried out away from direct sunlight to prevent any heating which would have an accelerated effect on the grout cure rate. The grout was tamped into place with a 1-inch thick steel cover plate bolted over the top and allowed to cure. Tamping of the grout is carried out to insure a smooth top surface.

It is well known that when an epoxy is cured by an amine there is a fairly large exothermic reaction. This exothermic reaction can cause resins to reach quite high temperatures when they cure. However, in the grout system of the present invention which includes a large proportion of aggregate, the aggregate material acts as a heat sink and absorbs much of the heat generated during the curing process. Temperature rise during the curing process is indicated to be limited below 60° C. It is important to keep the cure temperature low to prevent unwanted changes in the physical dimensions of the grout upon curing. And also at low temperatures thermal degradation during the cure is eliminated. As previously mentioned, dimensional stability of the epoxy grout as it cures is of considerable importance when the epoxy grout is used to fill cavities in grout resulting from deterioration. Measurements using a depth micrometer of dimensional change during cure and immediately thereafter and visual observation using a straight edge of the overall levelness of the top surface were made on the above-described batches after removal of the top steel plate cover. A slight expansion of the grout was experienced, with maximum expansion of the upper surface being only one-thousandth. In other areas of the grout samples, slight contractions on the order of one to two-thousandths were also observed after the grout had cooled and cured. The top surface of the cured grout was also essentially flat.

Samples of the grout material from both 190 lb. batches were taken and used to make compressive strength samples. These samples were tested for compressive strength after they had aged for one week. The results are as follows:

| Batch | Compressive strength; average of 3 samples, psi | Standard, deviation, psi |
| --- | --- | --- |
| 1 | 24,300 | ±630 |
| 2 | 22,800 | ±722 |

As shown in the Table, the epoxy resins have high compressive strengths which are necessary to stand up under the continual loading experienced by the telescope bearing assembly. A second sample of polymer grout was prepared as follows.

| | wt (gms) | % |
| --- | --- | --- |
| Screened JPL aggregate (less than 8 mesh) | 2704.0 | 84.50 |
| Epoxy resin (DOW DER 331) | 446.8 | 13.96 |
| Triethylenetetramine (TETA) | 49.1 | 1.53 |
| TOTALS | 3199.9 | 99.99 |

The sample was allowed to cure for at least 65 days in order to insure that ample time had been allowed for it to develop its full strength before any load was applied to it. The creep tests indicate that the epoxy grout compares favorably with that of the common Portland cement concrete presently used as grout which have been aged for four to five months.

Figure 4:
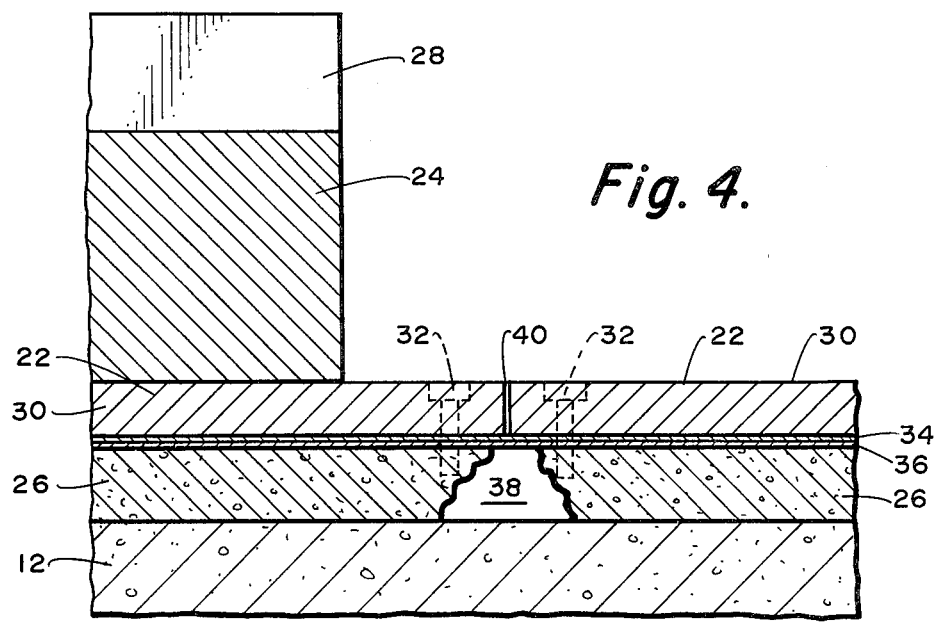
FIG. 4 is a detailed side view of the hydrostatic bearing assembly showing a deteriorated section of grout.

Referring now to FIG. 4, a typical cavity 38 in grout 26 is shown. The cavity has formed due to the deterioration of the Portland cement grout which is located beneath the bolt seam 40. Typically, the hydraulic oil will leak through bolt seam 40 and by way of bolts 32 down around or through the sole plates 34 and 36 and into the cement grout 26. The continual loading and unloading of pressure caused by pad 24 results in deterioration of the grout and formation of the cavity 38. As previously discussed, filling cavity 38 with Portland cement is not only undesirable because the service life of the Portland cement is limited, but also because the curing characteristics of Portland cement are delayed in the presence of any hydraulic fluid remaining in or near cavity 38. In accordance with the present invention, the epoxy grout may be placed into void 38 by tamping or other suitable application techniques so that the void is entirely filled by the epoxy grout. The fast curing capability of the grout (even in the presence of hydraulic oil) coupled with its strength and non-dimensional change upon curing are particularly well suited for this type of use.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein.

What is claimed is:

1. A fast-curing, non-sagging, oil-compatible, support grout consisting essentially of between 10–20% by weight of epoxy resin; 80–90% by weight of inert, inorganic filler having a mesh size below 10, less than 5% by weight of colloidal silica thickening agent and a fast curing agent for said epoxy resin in an amount effective to cure said epoxy resin in less than one minute to a rigid, cured state which is dimensionally stable under high loads and high pressures.

2. A support grout according to claim 1 in which the curing agent is triethylene tetramine.

3. A grout according to claim 1 in which the inert, inorganic filler is selected from graded sand or pebbles.

4. A grout according to claim 3 in which the cured grout has a compressive strength of at least about 22,000 psi.

5. A support grout in accordance with claim 1 wherein said grout consists of between about 14–17% by weight epoxy resin, less than 2% by weight colloidal silica and between about 83–86% by weight inert filler.

6. A support grout according to claim 5 wherein said epoxy resin is a Bis-Phenol A epoxy resin and said inert filler is sand aggregate.

7. A support grout according to claim 6 wherein said curing agent is an amine.

8. A support grout according to claim 6 wherein, said epoxy resin has an equivalent weight of between about 175 and 200 and has a viscosity of between about 10,000 and 18,000 cps.

9. A support grout according to claim 8 consisting essentially of about 82.1 percent by weight inert filler, 2.00 percent by weight colloidal silica, 14.10 percent by weight epoxy resin, and 1.80 percent by weight curing agent.

* * * * *